T. FRAME.
Hay Rake and Loader.
No. 59,205.
Patented Oct. 30, 1866.
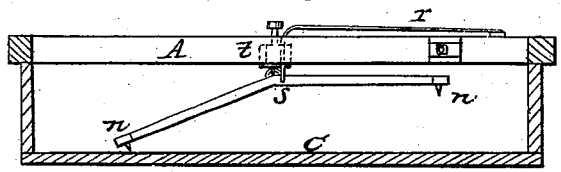
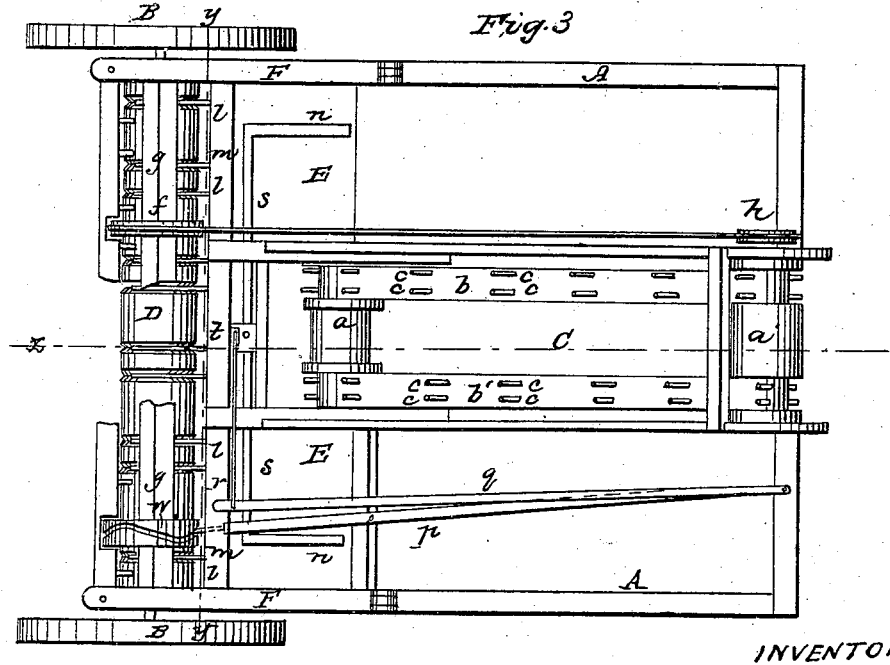
INVENTOR
WITNESSES

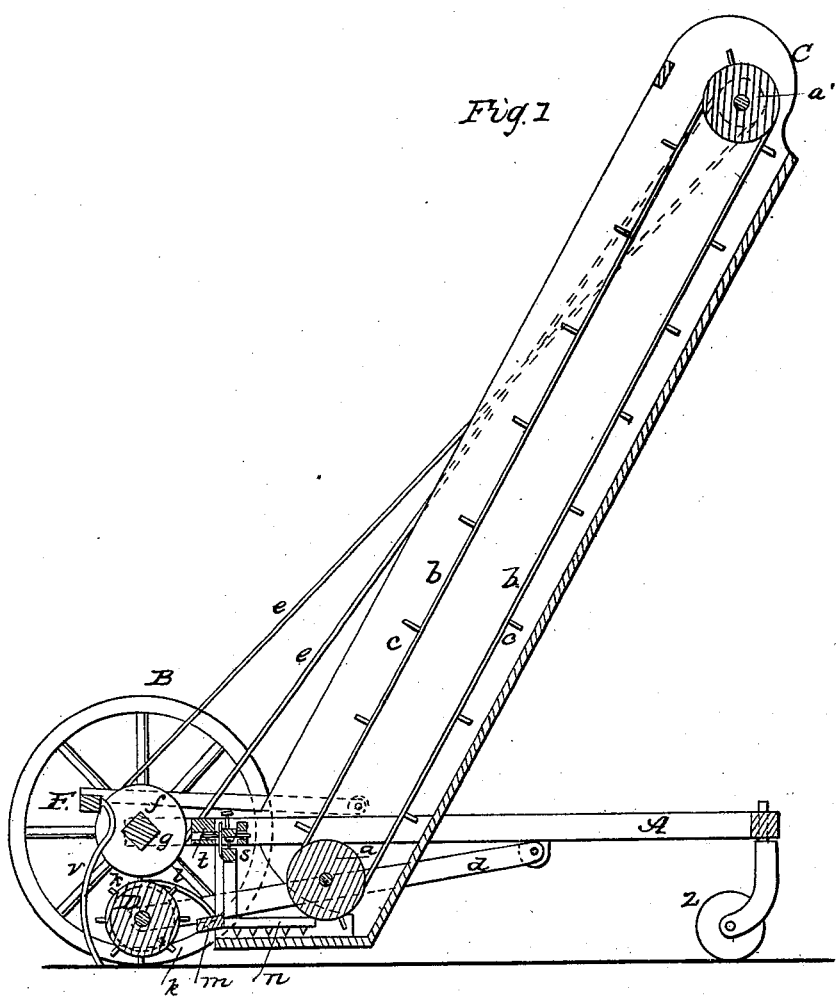

UNITED STATES PATENT OFFICE.

THOMPSON FRAME, OF BARNESVILLE, OHIO.

IMPROVEMENT IN MACHINES FOR RAKING AND LOADING HAY.

Specification forming part of Letters Patent No. 59,205, dated October 30, 1866.

*To all whom it may concern:*

Be it known that I, THOMPSON FRAME, of Barnesville, in the county of Belmont and State of Ohio, have invented a new and useful Improvement in Hay Rake and Loader; and I do hereby declare that the following is a full, clear, and exact description thereof, which will enable others skilled in the art to make and use the same, reference being had to the accompanying drawings, forming part of this specification, in which—

Figure 1 is a longitudinal section in the line $xx$, Fig. 3. Fig. 2 is a cross-section in the line $yy$, Fig. 3. Fig. 3 is a plan.

Similar letters of reference indicate like parts.

This invention relates to a labor-saving farm implement for raking and loading hay in the field, and it is to be attached to a wagon or cart, into which the hay is conveyed by a chute until it is filled, when it is detached, and remains waiting in the field for the return of the wagon after being emptied.

A A is a frame, mounted on the driving-wheels B B, and in the front supported on a caster or roller, $z$. C is a long rectangular box or chute, open in the upper side, and fastened to the frame A A, rising therefrom forward at an angle of about forty-five degrees. It occupies the middle of the frame, and is about one-third as wide as the space between the wheels. It is open at both ends and on the upper side.

At the ends of the chute are transverse rollers $a\ a'$, around which, on each side, pass flat endless belts $b\ b'$, having catch rakes or hooks $c\ c$ attached on one side, and projecting at right angles, or thereabout, within short distances of each other, the whole length of the belts. The belts receive motion from a pulley-band, $e\ e$, which passes over the pulley $f$ on the axle $g$, and works the pulley $h$ on the axis of the roller $a'$ at the upper end of the chute C.

Between the wheels is a light hollow roller, D, which may be made in sections, and is pivoted to the ends of bars $d\ d$, hung on each side under the frame A A. Rows of spikes $k\ k$ are set around the roller D. On each side of the spikes the roller is grooved for receiving curved rods $l\ l$, which fit the periphery of the roller and lie closely in the grooves, being attached at one end to a cross-bar, $m$, in front of the roller.

Just forward of the roller D is placed a platform, E, extending from one side to the other of the frame A A, and under the lower open end of the chute C. On the axle $g$ is placed a flat-faced roller or cam, $w$, having zigzag grooves cut around the periphery, for giving reciprocating motion to cross-rakes $n\ n$ on each end of the platform E by means of a reciprocating lever, $p$, the point of which follows the zigzag grooves, and moves sidewise another reciprocating lever, $q$, to which it is pivoted. From the end of the lever $q$ a stiff rod, $r$, extends to a connecting-rod, $s$, between the rakes $n\ n$. The connecting-rod is suspended to a block, $t$, that plays back and forth in slots over the lower end of the chute C.

On the upper side of the frame A A is pivoted a frame, F F, to which are fastened curved rods or fingers $v\ v$, which pass down near to the bottom of the roller, for gathering the hay from the ground.

The frame of the rake is attached to the hind end of a wagon or cart, so that the chute C hangs over the body, and when the machine is drawn over the field the fingers $v\ v$ gather the hay from the ground. The spikes $k\ k$ on the roller D then catch it and carry it over to the front side, where the strippers $l\ l$ receive and deliver it upon the platform E. There the reciprocating rakes $n\ n$ sweep it inward to the mouth of the chute C, where it is caught and taken up by the hooks $c\ c$ in the endless belts $b\ b$, that carry it up and deliver it over the upper end into the wagon.

Having described the construction and arrangement of my invention, what I claim as new, and desire to secure by Letters Patent, is—

1. The cam $w$ on the shaft $f$, in combination with the reciprocating levers $p\ q$, the connecting-rods $t\ s$, and the reciprocating cross-rakes $n\ n$, for drawing the hay by their reciprocating motion into the chute C, constructed and arranged as herein described.

2. The platform E, in combination with the reciprocating rakes $n\ n$ and the chute C, constructed and arranged as and for the purposes herein described.

THOMPSON FRAME.

Witnesses:
WILLIAM D. SMITH,
JOHN F. DAVIS.